United States Patent [19]

Brebner

[11] Patent Number: 4,883,719
[45] Date of Patent: Nov. 28, 1989

[54] METHOD OF SURFACE IMPREGNATION OF WOOD ARTICLES AND WOOD ARTICLES MADE THEREWITH

[75] Inventor: Keith I. Brebner, Guelph, Canada

[73] Assignee: Wood Polymer Composite Processes Ltd., Fredericton, Canada

[21] Appl. No.: 272,495

[22] Filed: Nov. 17, 1988

[30] Foreign Application Priority Data

Nov. 20, 1987 [CA] Canada ................................. 552414

[51] Int. Cl.$^4$ .............................................. B05D 3/00
[52] U.S. Cl. .................................... 428/541; 427/297; 427/440
[58] Field of Search .................. 427/297, 440; 428/541

[56] References Cited

U.S. PATENT DOCUMENTS

| | | | |
|---|---|---|---|
| 2,591,768 | 6/1951 | Austin | 117/72 |
| 2,909,450 | 10/1959 | Goldstein | 117/161 |
| 3,336,959 | 8/1967 | Parks | 144/327 |

OTHER PUBLICATIONS

"Dimensional Stabilization of Wood with Furfuryl Alcohol Resin" by Stamm, ACS, Washington, D.C. 1977.
"Wood-Polymer Materials" by Meyer, Advances in Chemistry Series, American Chemical Society, Washington, D.C. (1984).
"Impregnated Bobbins Are Found to Offer Better Wear Resistance".
"Maple Bobbins Get Protection".
Chemical Abstracts, vol. 84.

*Primary Examiner*—Michael Lusignan
*Attorney, Agent, or Firm*—Fay, Sharpe, Beall, Fagan, Minnich & McKee

[57] ABSTRACT

This invention pertains to a method of surface impregnation of wood articles with a plastic and to the resulting wood articles. The method includes treating dried, finished wood articles comprising the steps of degassing the wood to a specified partial pressure, soaking the degassed wood at atmospheric pressure in a diallyl o-phthalate monomer-prepolymer solution for a specified time and polymerizing in the range of 200–210 deg. F in a forced air oven. The cured samples can then be buffed to obtain the desired finish.

17 Claims, No Drawings

METHOD OF SURFACE IMPREGNATION OF WOOD ARTICLES AND WOOD ARTICLES MADE THEREWITH

FIELD OF THE INVENTION

This invention pertains to a method of surface impregnation of wood articles with a plastic and the resulting wood articles.

DESCRIPTION OF THE PRIOR ART

Plastic impregnation of wood is known. Indeed a number of processes that deal with the treatment of wood with vinyl monomer modified unsaturated polyester resins, i.e., a monomer-prepolymer combination have been described in the literature. The monomer, normally styrene, has a very low viscosity in relation to the ester prepolymer. Thus, when a wood article is vacuum-pressure impregnated with this mixture, the styrene can substantially penetrate the wood leaving the polyester more concentrated in the surface region. Unfortunately, this separation will result in a chemical gradient in the wood. After polymerization the surface tends to remain tacky and is unsuitable as a finish.

U.S. Pat. No. 3,336,959 (Parks) resolved this problem by coating the impregnated wood with a diallyl phthalate monomer-prepolymer solution. Heating caused the diallyl phthalate and polyester resin to crosslink. Parks indicated that the monomer modified unsaturated polyester was easy to use within the wood article, whereas the diallyl phthalate solution was a hard to handle impregnant and best applied on the surface.

Parks conducted high temperature polymerization (250-300 deg. F) when using the diallyl phthalate monomer-prepolymer coating. Wood blanks were therefore conditioned at these temperatures prior to the actual machining of the wood articles. One of the objectives was to relieve internal stresses in the wood that could release during subsequent polymerization, leaving the article warped. Another objective was to prevent internal pressure from the water vapour trapped in the center of the wood from causing the impregnant to exude from the surface of the article. Because bone-dry wood will splinter during machining, the blanks had to be equilibrated to 3 to 5% moisture content prior to producing the wood article. The major drawback of this method is that the wood article requires thermal conditioning to relieve internal stresses before impregnation.

U.S. Pat. No. 2,591,768 (Austin) also deals with the problem of surface tackiness by applying liquid sealants, e.g., high melting waxes, to the wood prior to polymerization. The drawback of this method is that if the sealant needs to be stripped after curing then the said method adds two more processes to reach the same goal.

Japanese Patents no. 74/92,204 and 74/92,205 (Urasugi et al.) describe the use of a diallyl phthalate monomer-prepolymer mixture dissolved in acetone (approx. a 50:50 ratio) to produce a wood-polymer composite having reduced stickiness. The volatile and highly flammable acetone is allowed to evaporate before thermal polymerization. Since acetone can swell the wood cell wall, the wood will undergo dimensional changes during treatment and potentially result in some distortion.

It is well known that liquid flow into wood is almost exclusively along the grain. Measurements show that the longitudinal permeability is orders of magnitude greater than the permeability in either the radial or tangential directions. This prevents the surface treatment of wood with polymerizable monomers from forming a wood-polymer surface shell around the wood (Meyer, J.A., the Chemistry of solid wood, Wood polymer materials; American Chemical Society, 1984, 257-289).

Because penetration is much faster through the end-grain, monomer can penetrate deeply in to the wood interior where enhancement of mechanical properties is not so important. Deep penetration of monomer may cause increased usage of monomer and increased weight of treated product, without corresponding benefit. We have found that it is possible to impregnate wood with a diallyl phthalate monomer-prepolymer solution, where the penetration of the solution into the wood is substantially confined to the surface areas of the wood where the enhancement of the mechanical properties is most useful. However, this is contrary to what would be predicted in view of the prior art.

OBJECTS OF THE PRESENT INVENTION

An object of this invention is to provide a method for the surface impregnation of a finished sanded wood article with a plastic.

Another object of the present invention is to provide a method for the impregnation of the surface substrate region of sanded wood articles resulting in a tough buffable surface finish.

The third object of the present invention is to provide a wood surface substrate impregnation method which avoids:
- pre-conditioning at elevated temperatures;
- swelling with volatile solvents which can result in grain raising and distortion; and
- the use of sealants.

DESCRIPTION OF THE INVENTION

In order to achieve these and other objects, there is provided a method for the surface impregnation of a dried finished wood article with a plastic comprising the following steps:
  (a) degassing the wood article to a predetermined partial pressure;
  (b) soaking the degassed wood article in a catalysed diallyl o-phthalate monomer-prepolymer solution for a predetermined period;
  (c) polymerizing at approximately 200 to 210 deg. F.

The articles may then be buffed to the desired finish. The monomer-prepolymer may be diallyl m-phthalate or diethylene glycol bis (allyl carbonate).

DESCRIPTION OF A PREFERRED EMBODIMENT

Kiln-dried (6 to 8% moisture content), finished-sanded wood articles are loaded into a basket and placed in a vacuum-pressure vessel. The wood is degassed to a specified partial pressure and a diallyl phthalate monomer-prepolymer solution is drawn into the treatment chamber while maintaining the specified partial pressure until the wood articles are covered. The pressure is then raised to atmospheric pressure and the articles are allowed to soak in the confining solution for 4 hours or until such time that adequate penetration is achieved. The basket is then raised out of the solution and allowed to drain. Polymerization is carried out in a forced air oven at approximately 200-210 deg. F to avoid gross warpage. The cured articles are then buffed to the desired finish.

The application of this invention to wood articles having differing surface configurations and species type is set out below.

EXAMPLE 1

Trembling Aspen Sapwood Moulding

The polymerizable solution is prepared as follows:

| Chemical | Parts by weight |
| --- | --- |
| diallyl phthalate monomer | 100 |
| diallyl phthalate prepolymer | 25 |
| benzoyl peroxide | 1 |
| t-butyl perbenzoate | 2 |

Optionally, 3 parts of 1,1'-azobis (cyclohexanecarbonitrile) can be substituted for the benzoyl peroxide and t-butyl perbenzoate combination. Solid diallyl phthalate prepolymer can be mechanically mixed with the diallyl phthalate monomer to form the solution. Complete dissolution takes 5 to 7 days. Another approach is to polymerize diallyl phthalate monomer using the usual methods of producing "prepolymers" and interrupt the polymerization process before gelation sets in (at about 25% conversion).

Trembling aspen sapwood moulding, 1.5×5/16×30 inches, was placed in a vacuum-pressure vessel, degassed to 400 torr and held for 15 minutes. The solution shown above was drawn into the vessel while maintaining 400 torr until the mouldings were completely covered. The partial pressure was returned to atmospheric and the mouldings were allowed to soak for 4 hours. They were then removed, allowed to drain and cured overnight at 200 deg. F. Finally, the treated mouldings were buffed to the desired finish.

The conversion of polymerizable solution to polymer ranged from 70-80% when corrected for moisture content loss (typically 6-9%). In relation to untreated aspen moulding the treated surface was much more scratch resistant and had the feel of a higher density wood moulding but without the equivalent weight. It was possible to nail the treated moulding, except within 1 to 1.5 inches of an exposed end where the polymer concentration was greatest. By changing the degassing pressure from 400 torr, the solution uptake in the aspen can be altered. After impregnation the density of the monomer-prepolymer solution (1.145 g/cc. at 70 deg. F with 25% by weight of prepolymer) increases and catalysed monomer must be added to maintain the solution density at 1.145 g/cc. Deeper penetration by the lower viscosity monomer accounts for the density increase in the solution and this separation effect is identical to that which occurs with polyester-styrene impregnants, but without the resultant surface tackiness. The extent of the density increase will be determined by the solution to wood ratio. The greater the ratio, the smaller the density increase.

EXAMPLE 2

Sycamore Shotgun Stocks and Forearms

Using the parameters outlined in Example 1, finish-sanded sycamore shotgun stocks and forearms, provided by U.S. Repeating Arms of New Haven, CT., were impregnated. The uptake of polymerizable solution ranged from 20-30% and the conversion ranged from 70-80% when corrected for moisture content loss (6-9%). The buffed surface had higher abrasion resistance than untreated sycamore.

EXAMPLE 3

Sugar Maple Sapwood Brush Handles

Using the parameters outlined in Example 1, finish-sanded sugar maple sapwood brush handles were impregnated. The uptake of polymerizable solution ranged from 25-40% and depended on the size and configuration of the brush handle. The conversion ranged from 60-70%. The brush handles were more moisture resistant after treatment.

Although the invention has been described with the use of specific examples its scope should not be limited thereto. Indeed, many variations may be made without departing from the spirit of the invention.

I claim:

1. A method for the surface impregnation of a dried finished wood article with a plastic comprising the following steps:
   (a) degassing the wood article to a predetermined partial pressure;
   (b) soaking the degassed wood article in a catalysed diallyl o-phthalate monomer-prepolymer solution for a predetermined period;
   (c) polymerizing at approximately 200 to 210 deg. F.

2. The method of claim 1 wherein the monomer-prepolymer is one diallyl m-phthalate or diethylene glycol bis (allyl carbonate).

3. The method of claim 1 wherein polymerization is carried out in a forced air oven.

4. The method of claim 1, wherein the solution comprises:
   100 parts by weight of diallyl phthalate monomer
   25 parts by weight of diallyl phthalate prepolymer
   1 part by weight of peroxide
   2 parts by weight of t-butyl perbenzoate.

5. The method of claim 1, wherein the partial pressure is approximately 400 Torr and the period is approximately 4 hours.

6. A surface impregnated wood article when made by the method of claim 1.

7. A surface impregnated wood article when made by the method of claim 4.

8. The method of claim 2 wherein the solution comprises:
   100 parts by weight of diallyl phthalate monomer,
   25 parts by weight of diallyl phthalate prepolymer,
   1 part by weight of peroxide,
   2 parts by weight of t-butyl perbenzoate.

9. The method of claim 3 wherein the solution comprises:
   100 parts by weight of diallyl phthalate monomer,
   25 parts by weight of diallyl phthalate prepolymer,
   1 part by weight of peroxide,
   2 parts by weight of t-butyl perbenzoate.

10. The method of claim 2 wherein the partial pressure is approximately 400 Torr and the period is approximately 4 hours.

11. The method of claim 3 wherein the partial pressure is approximately 400 Torr and the period is approximately 4 hours.

12. The method of claim 2 wherein the solution contains dyes and fire retardants.

13. The method of claim 3 wherein the solution contains dyes and fire retardants.

14. A surface impregnated wood article when made by the method of claim 2.

15. A surface impregnated wood article when made by the method of claim 3.

16. A surface impregnated wood article when made by the method of claim 5.

17. A surface impregnated wood article when made by the method of claim 6.

* * * * *